United States Patent Office 3,642,749
Patented Feb. 15, 1972

3,642,749
OLEFIN POLYMERIZATION USING DI-TERTIARY POLYALICYCLIC CHROMATE ESTER CATALYST SYSTEMS
Robert Norman Johnson, Basking Ridge, and Frederick John Karol and Louis Anthony Pilato, Somerset, N.J., assignors to Union Carbide Corporation, New York, N.Y.
No Drawing. Filed Mar. 27, 1969, Ser. No. 811,210
Int. Cl. C08f 1/30, 3/04, 15/04
U.S. Cl. 260—88.2 R     29 Claims

ABSTRACT OF THE DISCLOSURE

Ethylene polymers of broad molecular weight distribution are obtained from a catalyst system comprising a supported hindered di-tertiary polyalicyclic chromate ester treated with an organometallic reducing agent.

BACKGROUND OF THE INVENTION

It is now well known that ethylene can be polymerized with complex catalyst systems consisting of two or more components.

One such system is the supported hexavalent chromium oxide catalyst system disclosed in U.S. Pat. 2,825,721 to Hogan. This system has achieved broad commercial acceptance because it is non-corrosive and may be left in the product thereby avoiding the expensive catalyst recovery steps required for more corrosive catalyst systems. As with all catalyst systems, ethylene polymers produced using the hexavalent chromium oxide catalyst possess unique characteristics. One characteristic is that the polymers generally have narrow molecular weight distributions. While this is good for blow molding applications, polymers having broader molecular weight distributions are desired for such applications as wire coating. While blending can be resorted to, a need exists for non-corrosive catalyst systems which will directly cause the formation of polymers having broader molecular distributions slanted towards the high molecular weight and for such end use applications.

SUMMARY OF THE INVENTION

It has now been found that ethylene polymers having broad molecular weight distributions can be obtained directly from a polymerization process wherein a polymerizable olefin system containing ethylene is contacted with a catalytic quantity of a catalyst comprising an inert, inorganic oxide supported, hindered di-tertiary polyalicyclic chromate ester treated with an organometallic compound. The catalyst system is sensitive to hydrogen and temperature as separate and cooperative routes to control melt index of polymers produced.

DESCRIPTION

According to the present invention inorganic oxide supported, hindered di-tertiary polyalicyclic chromate esters when treated with an organometallic reducing agent become highly stable, active catalysts for the production of high density ethylene polymers of broad molecular weight distribution.

The di-tertiary polyalicyclic chromate esters used in the practice of this invention are, generally, esters of tertiary bridged polyalicyclic alcohols and have the general formula.

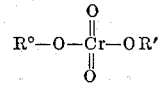

wherein R° and R′ are similar or dissimilar hindered polyalicyclic groups which contain two or more saturated rings which are sterically hindered by the presence of bridged ring structures.

The hindered di-tertiary polyalicyclic chromate esters of the present invention may be prepared by reacting the corresponding alcohol or alcohols with chromium trioxide in a non-reductive, non-solvolytic solvent for the alcohol. Suitable solvents include the more common saturated hydrocarbons, aromatic hydrocarbons, ethers, esters, ketones and the like all of which are normally compatible with alcohols. The reaction is preferably carried out under a dry inert atmosphere at temperatures of from about −100° to about 150° C. and has been found to proceed rapidly resulting in highly stable, readily soluble esters.

Illustrative, but no wise limiting, of the generic alcohols which may be used to form the hindered di-tertiary polyalicyclic esters are

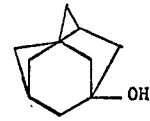
1-adamantanol

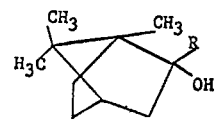
2-alkyl-2-borneol

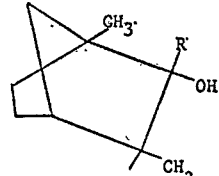
2-alkyl-2-fenchol

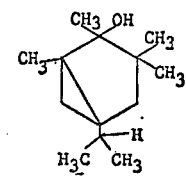
1,3,3-trimethyl-2-thujanol

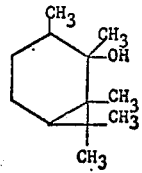
2,3-dimethyl-3-caranol

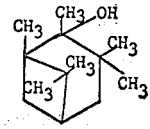
1,3,3-trimethyl-2-pinol

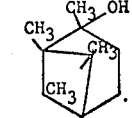
1-methyl-2-pinol

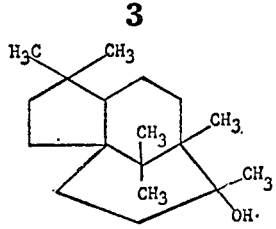

2,13,13-trimethyl-2-clovanyl

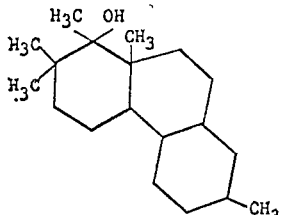

perhydro-1,3,3-trimethyl-2-pimanthrol

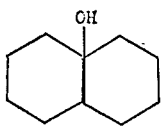

9-decalol

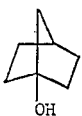

bicyclo(2.2.1)heptanol-1

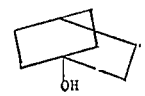

bicyclo(2.2.2)octanol-1

nortricyclanol-2

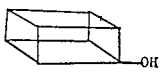

cubanol-1 wherein R is an alkyl group and like hindered tertiary alcohols.

Reaction with chromium trioxide leads to the formation of highly stable tertiary esters resulting from an alicyclic-alkyl juncture or an alicyclic bridgehead.

The di-2-alkyl bornyl and di-2-alkyl fenchyl chromate esters, for instance, may be used to illustrate an alicyclic-alkyl juncture. Di-2-alkyl bornyl chromate esters have the general structure (I).

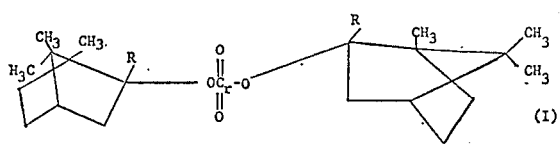

wherein R is an alkyl group, while di-2-alkyl fenchyl chromate esters have the general structure (II).

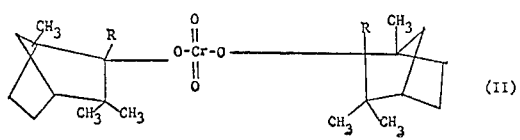

wherein R is an alkyl group.

Adamantyl chromate (III) serves as a good illustration for alicyclic bridgehead linkage.

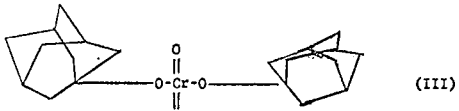

Quite unlike simpler esters like di-t-butyl chromate

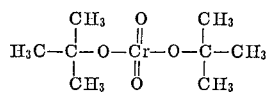

which are highly unstable and potentially explosive, these sterically hindered esters are extremely stable. While not bound by theory, it is postulated that Bredt's rule concerning bridged structures holds in substantiating their stability as compared to the unhindered chromate esters.

The hindered di-tertiary polyalicyclic chromate esters, however do not appear to inherently possess catalytic activity for olefins but must be supported on an inorganic oxide base and suitably treated with an organometallic compound.

The inorganic oxide supports for the hindered ditertiary polyalicyclic chromate esters are typically porous supports of high surface area. Generally, inorganic oxide supports having a surface area of from about 50 to about 800 square meters per gram and larger and a pore size of from about 60 to about 600 angstroms and larger are utile, with the higher pore size supports tending to result in the formation of polymers of higher melt index.

Among the various inorganic oxides which may be used as a support are silica, alumina, silica-alumina mixtures, thoria, zirconia and comparable oxides which are inert with respect to di-tertiary polyalicyclic chromate esters. Preferred supports are silica, and silica-alumina supports.

Among the commercial grades of the supports useful in the practice of the invention are G–MSID silica having a surface area of 350 square meters per gram and an average pore size of 200 angstroms, G–968 silica gel having a surface area of 600 square meters per gram and an average pore size of 67 angstroms, and G–969–ID having a surface area of 285 square meters per gram and an average pore size of 168 angstroms, as designated by W. R. Grace and Company.

The catalyst support should be completely dried before use. This is normally done by simple heating or predrying the catalyst support with an inert gas prior to use. It has been surprisingly found that the temperature of drying or activation also has an appreciable effect on the melt index of the polymer produced in the melt index decreases sharply with an increase in activation temperature.

Drying or activation of the support can be accomplished at nearly any temperature up to about its sintering temperature for a period of time at least sufficient to remove the adsorbed water but avoiding contact which will remove all of the chemically bound water. Passing an inert gas stream through the support during the drying aids in the displacement. Temperatures of from about 100° C. to 900° C. for a short period of about six hours or so should be sufficient if a well dried inert gas is used and the temperature is not permitted to get so high as to remove all the chemically bound hydroxyl groups on the surface of the support.

The organometallic compounds useful to treat the di-tertiary alicyclic chromate esters of the present invention include the alkyl aluminum compounds, alkyl boron compounds, organo aluminium compounds and organo zinc compounds.

The alkyl aluminum compounds that can be used are the trialkylaluminum compounds, the alkylaluminum halides, and the alkylaluminum hydrides. In these compounds the alkyl group can contain from 1 to about 14 carbon atoms, and the halogen can be chlorine, bromine, fluorine or iodine. Illustrative thereof one can mention trimethylaluminum, triethylaluminum, tributylaluminum, tridecylaluminum, tridodecylaluminum, diethylaluminum chloride, dibutylaluminum chloride, dibutylaluminum bromide, dibutylaluminum iodide, dibutylaluminum fluoride, dihexyaluminum chloride, methylaluminum dichloride, ethylaluminum dibromide, butylaluminum dichloride, pentylaluminum dichloride, and the like, as are well known in the art. They can be generically classed as compounds of the formula $$R''_y AlX_z$$

wherein R'' is an alkyl group as defined above, $x$ is hydrogen or a halogen and $y$ is an integer from 1 to 3 inclusive and $z$ is an integer from 0 to 2 inclusive, the sum of $y$ and $z$ being 3.

The alkyl boron compounds that can be used in the practice of this invention are compounds of the general formula $$BR''_3$$

wherein R'' is an alkyl group containing from 1 to about 14 carbon atoms as defined above. Illustrative thereof one can mention trimethylborane, triethylborane, triisobutyl borane, tributyl borane and the like. Triethyl borane is the preferred modifying agents of this class.

The organo aluminum compounds which are commonly termed "aluminum alkoxides" are compounds of the general formula $$R'''_x Al(OR''')_w$$

in which $x$ and $w$ are integers from 1 to 2 inclusive and together total 3, and R''' is a hydrocarbyl group containing from 1 to about 14 carbon atoms. The R''' hydrocarbyl group is not critical and can be any selected hydrocarbon group such as alkyl, aralkyl, aryl, alkaryl, alicyclic, bicyclic and the like hydrocarbons. Illustrative thereof are methyl, ethyl, propyl, iso-propyl, n-butyl, iso-butyl, n-pentyl, iso-pentyl, t-pentyl, hexyl, cyclohexyl, 2-methylpentyl, heptyl, octyl, 2-ethylhexyl, cyclohexylmethyl, nonyl, decyl, undecyl, dodecyl, tridecyl, tetradecyl, benzyl, pinyl, pinylmethyl, phenethyl, p-methylbenzyl, phenyl, tolyl, xylyl, naphthyl, ethylphenyl, methylnaphthyl, dimethylnaphthyl, norbornyl, norbornyl methyl or any such similar hydrocarbyl groups. Those R''' groups directly bonded to the aluminum atom containing from 1 to 8 carbon atoms are least expensive and most readily available of these compounds. Obviously the R''' groups can be the same or different.

The one or two oxyhydrocarbyl groups also attached to the aluminum atom are obtained preferably by direct interaction between the hydrocarbon alcohol or phenol corresponding to the desired oxyhydrocarbyl groups and an aluminum trihydrocarbon corresponding to the hydrocarbyl group desired in the compound. The interaction is rapid and complete upon simple admixture of the stoichiometric amount of the alcohol. No catalyst or heating is required.

If desired, the oxyhydrocarbyl aluminum compounds can even be generated in situ in the system by the presence of a small but stoichiometrically calculated amount of the desired alcohol with the trihydrocarbyl aluminum immediately prior to the polymerization as hereinafter shown.

Another group of organometallic compounds which can be used independently or cojointly with the alkyl aluminum compounds, alkyl boron compounds or the organo aluminum compounds are organo zinc compounds. Such organo zinc compounds include zinc diethyl, zinc di-isopropyl and the like. In addition to function as an activator, the organo zinc compounds also serve as scavengers for any impurities in the system.

Also included within the scope of this invention are the use of mixtures of alkyl aluminum compounds, mixtures of alkyl boron compounds, mixtures of organo aluminum compounds and mixtures of organo zinc compounds.

The amount of organo metallic compounds used in conjunction with the supported di-tertiary polyalicyclic chromate esters is not narrowly critical and need only be present in an amount sufficient to reduce the di-tertiary polyalicyclic chromate esters to the active catalytic form. Even amounts as low as 0.1 mole of aluminum or boron per mole of chromium can be used although from about 1 to about 16 moles of aluminum, boron or zinc per mole of chromium is a more preferred range with greater amounts allowed as an excess of the organometallic reducing agent will not adversely effect catalytic activity.

So also, the amount of inorganic oxide support is not narrowly critical. Generally an amount of support of from about 20 grams or more per millimole of chromium will provide an effective catalyst system.

The catalyst system of the present invention may be readily prepared by blending of the di-tertiary polyalicyclic chromate ester, organo metallic compound and support in a suitable solvent for the ester. Suitable solvents include, among others saturated aliphatic hydrocarbons, such as hexane, heptane, pentane, isooctane, purified kerosene and the like, saturated cycloaliphatic hydrocabons, such as cyclohexane, cyclopentane, dimethylcyclopentane and methylcyclohexane and the like, aromatic hydrocarbons such as benzene, toluene, xylene, and the like, and chlorinated hydrocarbons, such as chlorobenzene tetrachloroethylene, ortho-dichlorobenzene, and the like. Particularly preferred solvent media are cyclohexane, pentane, hexane, and heptane. The system may also be prepared by direct addition of the catalyst compounds into the polymerization system prior to the introduction of ethylene.

The polymerization reactions using the catalyst system of this invention are carried out at temperatures of from about 30° C. or less up to about 200° C. or more, depending to a great extent on the operating pressure, olefin monomer, the particular catalyst and its concentration. Naturally, operating temperature may be selected to produce the desired polymer melt index since temperature is definitely a factor in adjusting the molecular weight of the polymer. Preferably the temperature is from about 30° C. to about 110° C. in the slurry or "particle forming" technique and from 100° C. to 200° C. in "solution forming." The control of temperature in this process is desirable as hereinafter more fully described in providing various effects upon molecular weight of the polymers as well as in controlling the phase in which they are made. As with most catalyst systems, the higher temperatures produce the lower weight average molecular weight polymers, and consequently of higher melt index.

Regardless of whether the "particle forming" low temperatures or "solution forming" high temperatures are employed, a unique faculty of this catalyst system is the ability to carry out the polymerization to very high polymer solids, substantially higher than that obtainable with any other catalyst system without fouling of the equipment.

The pressure can be any pressure sufficient to initiate the polymerization of the monomer to polymer and can be carried out from subatmospheric pressure, using an inert gas as diluent, to superatmospheric pressure up to about 1,000,000 p.s.i.g. or more, but the preferred pressure is from atmospheric up to about 1000 p.s.i.g. with pressures of 20 to 500 p.s.i.g. particularly preferred. However, as can be seen from the discussion and the appended examples, a wide latitude of pressures can be employed to secure the high polymers.

An inert organic solvent medium when employed in this invention is not narrowly critical but it should be inert to the catalyst and olefin polymer produced and stable at the reaction temperature used. It is not necessary, however, that the inert organic solvent medium serve also as a solvent for the catalyst composition or for the polymer produced. Among the inert organic solvents applicable for such purpose may be mentioned saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like, and chlorinated hydrocarbons, such as chlorobenzene, tetrachloroethylene, ortho-dichlorobenzene, and the like, and chlorinated hydrocarbons, such a schlorohexane, isopentane, hexane and heptane.

When it is desired to conduct the polymerization to a high solids level as hereinbefore set forth, it is of course desirable that the solvent be liquid at the reaction temperature. For example, operating at a temperature less than the solution temperature of the polymer in the solvent, the process can be essentially a slurry or suspension polymerization process in which the polymer actually suspended through agitation in the liquid reaction medium and in which the catalyst is suspended as finely divided mass as hereinbefore set forth.

The slurry system is of course dependent upon the particular solvent employed in the polymerization and its solution temperature of the polymer prepared. Consequently, in our "particle form" embodiment, it is most desirable to operate at a temperature less than the normal solution temperature of that polymer in the selected solvent. As for example, polyethylene prepared herein has a solution temperature in cyclohexane of about 90° C. and whereas in pentane its solution temperature is about 110° C. It is characteristic of this "particle form" polymerization system that the high polymer solids content is possible even at low temperatures provided agitation is present to enable adequate mixing of the monomer with the polymerizing mass. It appears that while the polymerization rate may be slightly slower at the lower temperatures, the monomer is more soluble in the solvent medium thus counteracting any tendency to low rates and/or low yields.

It is also characteristic that the monomer appears to have substantial solubility characteristics even in the solids portion of the slurry so that as long as agitation is provided and polymerization temperature maintained, a broad range of size of solid particles in the slurry can be provided. It has been our experience that the slurry technique can produce better than a fifty percent solids system, provided sufficient fluidizing conditions and agitation is maintained. We most particularly prefer to operate the slurry process in the range of 30-40 weight percent of polymer solids.

Recovery of the polymer from the solvent medium is in this embodiment simplified to a simple filtration and drying operation and no efforts need be expended in polymer clean up and catalyst separation or purification as the residual concentration of catalyst in the polymer in innocuous and unnoticed.

Operating at temperatures higher than the solution temperature of the polymer in the selected solvent medium also can produce a high polymer solids content in solution. The temperature in this embodiment must be sufficiently high to enable the solvent being used to dissolve at least 25-30 percent by weight of the polymer. On the other hand, the temperature must be sufficiently low to avoid thermal destruction of the formed polymer and the particular catalyst employed. Thus the solvent employed must be chosen with regard to the catalyst selected in order that the temperature requirements for adequate solvation and catalyst existence are not exceeded. In general, for the various solvents and catalyst used, temperatures within the range of about 100° C. to about 200° C. and preferably about 130° C. to about 170° C., have been found to be generally optimum for the practice of such solution polymerization. However, the particular polymer being produced also has a significant effect on the optimum temperature. For example, ethylene-propylene copolymers produced by this process are soluble in many of these organic solvents at low temperatures and hence the use of such temperatures is permissible in this invention even though such temperatures may not be desired or optimum for producing polyethylene or other olefin homopolymers or copolymers.

When the solvent serves as the principal reaction medium, it is of course desirable to maintain the solvent medium substantially anhydrous and free of any possible catalyst poisons, by redistilling or otherwise purifying the solvent before use in this process. Treatment with absorbents such as high surface area silicas, aluminas, molecular sieves and like materials are beneficial in removing trace amounts of contaminants that may reduce the polymerization rate or poison the catalyst during reaction.

However, it is also possible to operate the polymerization reaction without an added solvent reaction medium, if desired. For example, the liquid monomer itself can be the reaction medium, either with the normally liquid monomers as in making ethylene-propylene copolymers using liquefied propylene and other similar normally liquid monomers or by operating under sufficient pressure that a normally gaseous monomer is liquefied.

Still another advantage of the present process is provided by maintaining the catalyst and the polymer, as formed, in homogeneous solution in the solvent medium. By avoiding the formation of a polymer suspension, the reaction mass behaves surprisingly as a viscous fluid which can be pumped and handled by any of the standard techniques for handling fluids.

Still another advantage of having the polymer soluble in the diluent is that high reaction temperatures can be employed. This is advantageous because the high temperatures reduce the viscosity of the solution, they also cause the polymerization to proceed faster, and allow more efficient removal of the heat of reaction because of the large temperature differential between the reactor and the cooling water, and also permit control of the polymer molecular weight, since high reaction temperatures generally cause the formation of lower molecular weight polymer. This latter factor is particularly important in the production of waxes of high melt index as is demonstrated hereafter in the appended examples.

The separation of polymer from the solvent medium may be accomplished through the use of a mill, such as a Marshall mill. It is also possible to employ precipitation and filtration techniques to recover the polymer, or to concentrate the polymer/solvent mass by flash evaporation or other means of solvent removal followed by high shear milling. A number of other suitable high shear mills are commercially available and, because of the low solvent content of the solution to be treated, other devices such as vented extruders, calendering roll mills, planetary rotor mills, Banbury mills, and the like, can also be successfully employed to accomplish isolation of the polymer product.

It should be understood that the high solids system can be employed with the catalyst dissolved in the solvent or in solid condition as finely divided particles or deposited or absorbed on a support as hereinbefore set forth, provided that the necessary conditions of agitation, pressure, temperature, and the like are maintained so to provide contact of the monomer with the catalyst, and that the pressure and temperature are such as to initiate the polymerization of that monomer to the polymer.

It should also be understood that the invention herein contemplated, includes the techniques of fluidizing the solid catalyst bed in a gaseous system and contacting it with a gaseous olefin feed thereby eliminating the use of liquid solvents and the attendant problems of solvent separation and catalyst poisons as hereinbefore mentioned.

The amount or concentration of di-tertiary polyalicyclic chromate employed in this invention is not critical and primarily only affects the rate and yield of polymer secured. It can be varied from about 1 to 25,000 parts per million based on the weight of olefin charged. Preferably and for greatest economy of operation, the concentration is maintained from about 5 to 100 parts per million. Obviously, the lower the impurity level in the reaction system, the lower the catalyst concentration that can be used.

Among the monoolefins which can be polymerized with ethylene are those containing from 2 to about 10 carbon atoms. Illustrative thereof but not limiting are ethylene, propylene, butene-1, pentene-1, 3-methylbutene-1, hexene-1, 4-methylpentene-1, 3-ethylbutene-1, heptene-1, octene-1, 4,4-dimethylpentene-1, 4,4-diethylhexene-1, 3,4-dimethylhexene-1, 4-butyl-1-octene, 5-ethyl-1-decene, and the like. Such compounds can be polymerized in combination to yield copolymers of two or more comonomers. The monoolefins can also be copolymerized to yield copolymers with diolefins such as butadiene, dicyclopentadiene, and the like diolefins and thus secure cross-linkable unsaturated copolymers. Polyethylene is the particularly preferred homopolymer. Preferred copolymers are those containing a major proportion of interpolymerized ethylene, propylene or butene along with a minor proportion of any other monomer copolymerizable therewith. The particularly preferred copolymers are ethylene-propylene or ethylene-butene copolymers having up to 50 weight percent of the interpolymerized propylene or butene.

Hydrogen as a component of the polymerization system is of significant utility as a route to melt index control. All other factors being constant, melt-index of the polymer will increase with hydrogen concentration. In particular copolymerizations at about 75° C. in the presence of hydrogen appears to lead to copolymers of greatly improved melt fracture characteristics. As a useful component of the polymerization systems of this invention, hydrogen may be present in an amount up to about 10 percent by weight preferably 2 percent or less by weight based on the total weight of olefin monomers.

While no wise limiting the following examples are designed to establish the utility of the di-tertiary polyalicyclic chromate esters systems of this invention as polymerization catalysts and show the general nature of the polymer properties obtained by their use.

The following standards were used on measuring physical properties

Density _____ ASTM D-1505-57T
Melt index (MI) (44 p.s.i.,
  190° C.) _____ ASTM D-1238-65T
Melt flow (MF) 440 p.s.i.,
  190° C.) _____ ASTM D-1238-65T

PREPARATION OF POLYALICYCLIC CHROMATES

Example 1

To a 1000 ml. Erlenmeyer flask equipped with a condenser and magnetic stirrer there was added at 55° C. 216 grams of carbon tetrachloride, 6.7 grams dry magnesium sulfate, 20 grams 0.131 mole) 1-adamantanol and 10 grams (0.1 mole) of chromium trioxide with the chromium trioxide being added incrementally to control foaming. The mixture, which was dark, was stirred at 55° C. for 4 hours. To the resultant mixture, a deep red solution and black solids, there was added with stirring 3 grams of charcoal and 2 grams of an inert filter aid. The mixture was gravity filtered and the solids washed with carbon tetrachloride allowing the washings to combine with the main filtrate. The filtrate was then concentrated to a red syrup under vacuum at 50° C. and allowed to remain overnight at 20° C. in a vacuum oven. The dark brown solid that remained weighed 28.1 grams (theoretical yield of adamantyl chromate being 25.3 grams). To obtain further purification, 75 grams of carbon tetrachloride, 3 grams of charcoal and 2 grams of an inert filter aid was added to the solid and the mixture warmed slightly and filtered to give a bright red solution. After removal of carbon tetrachloride by vacuum evaporation, 22.6 grams of a bright orange solid having a melting point of 168° C. was obtained without decomposition. Carbon and hydrogen analysis revealed the following

| Element | Calculated, percent | Found, percent |
|---|---|---|
| Carbon | 62.3 | 62.25 and 62.16. |
| Hydrogen | 7.83 | 8.07 and 8.02. |

Infrared spectrum showed strong absorption at 10.4$\mu$ which was characteristic of the chromate ester group and at 10.8 characteristic of the adamantyl group.

Example 2

To the apparatus described in Example 1 there was added 50 ml. carbon tetrachloride 3.6 grams (0.0214 mole) 2-methyl-2-borneol, 2.53 grams of magnesium sulfate and 1.19 grams (0.0119 mole) of chromium trioxide. The mixture was stirred for 1.5 hours with an accompanying temperature rise to 35° C. After cooling and filtering, the filtrate was evaporated to dryness leaving 3.3 grams of a solid material which was dissolved in acetone, treated with activated charcoal and filtered. Cooling the filtrate in an ice bath yielded 0.73 gram of bright orange crystals having a melting point of 109° C. Carbon and hydrogen analysis revealed the follownig

| Element | Calculated percent | Found, percent |
|---|---|---|
| Carbon | 63.13 | 63.21 |
| Hydrogen | 9.15 | 9.12 |

Example 3

Following the general procedure set forth in Example 2, 3.6 grams of (0.0214 mole) of 2-methyl-2-fenchol was reacted with 12 grams chromium trioxide (0.07 mole) for 3 hours at 25 to 35° C. After suitable washings 2.5 grams of bright red crystals having a melting point of 120° C. were obtained. Carbon and hydrogen analysis revealed the following

| Element | Calculated, percent | Found, percent |
|---|---|---|
| Carbon | 63.13 | 63.18 |
| Hydrogen | 9.15 | 8.94 |

HOMOPOLYMERIZATION OF ETHYLENE

Example 4

To a one liter low-pressure stirred reactor equipped with a water filled heating jacket containing 500 ml. dry n-hexane under a nitrogen blanket there was added 0.4 gram of silica which had been heat activated at 450° C. and 0.006 gram of the bis-adamantyl chromate prepared in Example 1. The mixture was stirred for 15 minutes at room temperature under nitrogen and 0.5 ml. of a diethylaluminum ethoxide/n-hexane solution containing 0.7 mole diethylaluminum ethoxide per milliliter was added. The reactor was heated to 90° C. and pressurized with ethylene to a total pressure of 300 p.s.i.g. Reaction was continued for one hour at 90° C., cooled and solvent removed by evaporation. There was obtained 90 grams of a polyethylene having a density of 0.9572, a melt index of 0.018 dgm./min. and a melt flow of 2.05 dgm./min.

Example 5

Using similar apparatus and the general procedure set forth in Example 4, a series of experiments were made to establish the effect of support properties and hydrogen as a component of the gaseous charge on productivity and polymer properties. In all instances n-hexane served as the solvent, total pressure was 300 p.s.i.g. and the supported catalyst consisted of from 0.04 to 0.06 millimole adamantyl chromate per 0.63 millimole diethylaluminum ethoxide per gram of silica support.

For Examples 5 to 12 the apparatus and procedure was identical to that set forth in Example 4.

A larger 5 gallon stirred reactor and slightly modified procedure for introducing catalyst to the reactor was used for Examples 13 to 19. To introduce catalyst to the larger system an 8 oz. serum capped bottle was half filled with dry, oxygen free n-hexane and adamantyl chromate added and dissolved in the dark under an atmosphere of argon. The dried silica support protected by an argon atmosphere was then added. After deposition appeared complete i.e., about 1 minute, the diethylaluminum ethoxide was added using a syringe and resultant supported catalyst pumped into the reactor at 50° C. Generally the reactor was charged with about 12 liters of n-hexane for each polymerization.

Data pertinent to the studies appears in Table I.

added and stirred continuously under nitrogen for 0.5 hour. The catalyst was then reduced by the addition of 0.5 ml. of a diethyl aluminum ethoxide/n-hexane solution containing 0.432 mole diethyl aluminum ethoxide/milliliter. The mixture was added to a one-liter stirred low pressure reactor containing 500 ml. n-hexane. The reactor was pressurized with ethylene to a pressure of 200 p.s.i.g. and heated to 92° C. After 0.75 hour there was obtained 27 grams of an ethylene homopolymer having a melt index of 0.108 dgm./min. and a melt flow of 0.0108 dgm./min.

Example 25

To a 100 ml. n-hexane contained in an 8 ounce nitrogen purged bottle there was added 0.006 gram di-2-methyl

TABLE I

| Example | Silica support properties | | Activation temp., °C. | Polymerization conditions | | | Productivity [1] | Polymer properties | | |
|---|---|---|---|---|---|---|---|---|---|---|
| | Average pore size, Å. | Area, m.²/gm. | | $H_2$, p.s.i. | Time, hr. | Temp., °C. | | MI | MF | MF/MI |
| 5 | 200 | 350 | 110 | 0 | 1.75 | 95 | 344 | 0.21 | 17.0 | 87 |
| 6 | 200 | 350 | 110 | 0 | 0.5 | 95 | 254 | 0.17 | 17.7 | 104 |
| 7 | 200 | 350 | 350 | 0 | 0.5 | 95 | 526 | 0 | 5.9 | |
| 8 | 200 | 350 | 450 | 0 | 0.5 | 90 | 334 | 0 | 1.6 | |
| 9 | 200 | 350 | 450 | 0 | 0.5 | 95 | 155 | 0 | 4.2 | |
| 10 | 168 | 285 | 300 | 0 | 0.5 | 95 | 260 | 0 | 1.2 | |
| 11 | 200 | 350 | 320 | 50 | 0.5 | 90 | 210 | 0.84 | 53 | 63 |
| 12 | 200 | 350 | 320 | 50 | 0.5 | 95 | 414 | 1.5 | 78 | 54 |
| 13 | 67 | 600 | 530 | 0 | 1.0 | 93 | 250 | 0 | 0.52 | |
| 14 | 200 | 350 | 300 | 50 | 1.25 | 95 | 668 | 1.5 | 85 | 56 |
| 15 | 200 | 350 | 300 | 100 | 2.0 | 93 | 265 | 1.8 | 95 | 54 |
| 16 | 200 | 350 | 300 | 100 | 2.0 | 95 | 362 | 2.2 | 132 | 61 |
| 17 | 200 | 350 | 300 | 150 | 2.0 | 90 | 304 | 3.4 | 223 | 65 |
| 18 | 168 | 285 | 580 | 50 | 2.0 | 93 | 372 | 1.0 | 62 | 62 |
| 19 | 168 | 285 | 580 | 100 | 1.75 | 93 | 201 | 3.8 | 164 | 44 |
| 20 | 200 | 350 | 320 | 50 | 0.5 | 92 | 112 | 0.5 | 41 | 88 |
| 21 | 200 | 350 | 320 | 50 | 0.5 | 95 | 477 | 1.9 | 88 | 55 |

[1] Productivity—Grams of polymer per gram of catalyst per hour

Example 22

To the apparatus described in Example 4 containing 50 ml. n-hexane under nitrogen blanket there was added 0.016 millimole adamantyl chromate and 0.4 gram of a silica having an average pore size of 200 angstroms and a surface area of 350 square meters per gram which had been activated at 350° C. The mixture was stirred and 0.256 millimole of triethyl aluminum was added as a reducing agent. The reaction system was heated to 92° C. and pressurized with ethylene to a total pressure of 300 p.s.i.g. After 45 minutes there was obtained 25 grams of an ethylene homopolymer.

Example 23

The procedure of Example 22 was repeated except that triethyl borane was used in place of triethyl aluminum as the reducing agent and the polymerization was carried out at 93° C. After 30 minutes 27 grams of an ethylene homopolymer having melt flow 0.705 dgm./min. was obtained.

Example 24

To a 100 ml. n-hexane contained in an 8 ounce nitrogen purged bottle there was added 0.007 gram di-2-methyl bornyl chromate prepared in Example 2. After stirring for 5 minutes, 0.4 gram of silica support having an average pore size of 200 angstroms and surface area of 350 square meters per gram which had been activated at 350° C. was fenchyl chromate prepared in Example 2. After stirring for 5 minutes, 0.4 gram of silica support having an average pore size of 200 angstroms and surface area of 350 square meters per gram which had been activated at 350° C. was added and stirred continuously under nitrogen for 10 minutes. The catalyst was then reduced by the addition of 0.6 ml. of a diethyl aluminum ethoxide/n-hexane solution containing 0.407 mole diethyl aluminum ethoxide milliliter. The mixture was added to a one-liter stirred low pressure reactor containing 500 ml. n-hexane. The reactor was pressurized with ethylene to a pressure of 200 p.s.i.g. and heated to 95° C. After 1 hour there was obtained 45 grams of an ethylene homopolymer having a melt index of 0.014 dgm./min. and a melt flow of 1.758 dgm./min.

COPOLYMERIZATION OF ETHYLENE

Examples 26–40

To establish the utility of bis-adamantyl chromate as copolymerization catalyst, a series of studies were made involving the polymerization of ethylene and propylene. Each reaction was carried out using n-hexane as the solvent in apparatus substantially as that described in Example 4, and under a total pressure of 300 p.s.i.g. In all instances the supported catalyst, contained from about 0.04 to 0.06 millimoles bis-adamantyl chromate per gram of silica support and quantity co-catalyst sufficient to provide an aluminum to chromium ration of 16 to 1. The co-catalyst in Examples 26–33 was diethyl aluminum ethoxide. The co-catalyst for Examples 34–38 was diethyl aluminum 2[7-7 - dimethyl[3,1,1]bicyclohepyl - 2] ethoxide while the co-catalyst for Examples 39 and 40 was diethyl aluminum isopropoxide.

cosity on $A_w$. Again a high $A_w/A_n$ ratio is indicative of broad molecular weight distribution.

TABLE II

| Example | Silica support properties | | | Polymerization conditions | | | Polymer properties | | | | | |
|---|---|---|---|---|---|---|---|---|---|---|---|---|
| | Average pore size, A. | Area, m.²/gm. | Activation temp., °C. | C₃H₆, p.s.i. | H₂, p.s.i. | Temp., °C. | Productivity | MI | MF | MF/MI | Density | Percent propylene content |
| 26 | 200 | 350 | 200 | 10 | 0 | 92 | 350 | 0.17 | 12.7 | 74 | 0.959 | 0.83 |
| 27 | 200 | 350 | 200 | 50 | 0 | 94 | 173 | 0.88 | 59 | 67 | 0.946 | 2.62 |
| 28 | 200 | 350 | 200 | 100 | 0 | 94 | 163 | 0.75 | 48 | 64 | 0.939 | |
| 29 | 168 | 285 | 400 | 15 | 0 | 82 | 690 | 0.06 | 4.8 | 80 | | |
| 30 | 168 | 285 | 400 | 30 | 0 | 86 | 717 | 0.19 | 12.8 | 68 | 0.950 | 1.97 |
| 31 | 168 | 285 | 400 | 35 | 0 | 92 | 462 | 0.6 | 37 | 62 | | |
| 32 | 168 | 285 | 400 | 50 | 0 | 80 | 445 | 0.28 | 30.9 | 111 | 0.943 | |
| 33 | 168 | 285 | 400 | 50 | 0 | 85 | 391 | 0.42 | 40.9 | 98 | | |
| 34 | 168 | 285 | 400 | 30 | 0 | 85 | 310 | 0.04 | 60.0 | 150 | | |
| 35 | 168 | 285 | 400 | 35 | 0 | 90 | 269 | 0.14 | 12.2 | 98 | | |
| 36 | 168 | 295 | 400 | 25 | 0 | 95 | 488 | 0.50 | 54 | 108 | | 2.48 |
| 37 | 168 | 285 | 400 | 35 | 15 | 76 | 256 | 0.28 | 22.7 | 81 | | |
| 38 | 168 | 285 | 400 | 25 | 25 | 83 | 416 | 1.3 | 79 | 61 | | |
| 39 | 168 | 285 | 400 | 25 | 15 | 73 | 447 | 0.21 | 11.6 | 55 | | 1.79 |
| 40 | 168 | 285 | 400 | 30 | 0 | 92 | | 0.47 | 30.8 | 66 | | 2.40 |

Example 41

To establish that polymers produced using di-tertiary polyalicyclic chromate ester catalyst systems have broader molecular weight distribution than polymers prepared using hexavalent chromium oxide catalysts, the molecular properties of polymers produced in several of the foregoing examples were compared to typical polymers produced using a hexavalent chromium oxide catalyst. The comparative data appears in Table III where polymers produced using a hexavalent chromium oxide catalyst are controls A to C, and the abbreviations not defined before have the following meaning.

IV—Intrinsic viscosity determined in Decalin at 130° C.
Percent ext.—Percent soluble in boiling cyclohexane after 24 hours.
Percent swell—Equilibrium die swell wherein material extruded at a shear rate of 78.5 sec.⁻¹ and 156 sec.⁻¹ are reswollen at 150° C. in silicone oil. The diameter is then compared to that of the die used. The average of the two is reported as percent swell.
$A_w/A_n$—Ratio of weight average molecular weight to number average molecular weight as determined by gel permeation chromatography.

A higher percent die swell is also a clear indication of broader molecular weight distribution. This property desired in wire coating applications because it predicts good stress crack resistance. From the above, it was concluded that polymers prepared with a di-tertiary polyalicyclic chromate ester catalyst systems will, all other factors constant, have broader molecular weight distributions than polymers prepared with a hexavalent chromium oxide catalyst system.

What is claimed is:

1. A process for the polymerization of ethylene which comprises contacting ethylene with a catalytic amount of an inorganic oxide supported, hindered di-tertiary polyalicyclic chromate ester treated with an organometallic reducing agent compound, at a temperature and at a pressure sufficient to initiate the polymerization reaction.

2. A process as claimed in claim 1 in which ethylene is homopolymerized to normally solid, high molecular weight polymer.

3. A process as claimed in claim 1 in which a major amount of ethylene and a minor amount of at least one other α-olefin are interpolymerized to a normally solid, high molecular weight interpolymer.

TABLE III.—MOLECULAR WEIGHT DISTRIBUTION AS A FUNCTION OF CATALYST TYPE

| Source | Comonomer | Density | MI | IV | Percent extension | Percent swell | $A_w/A_n$ |
|---|---|---|---|---|---|---|---|
| A.—di-Tertiary polyalicyclic chromate esters | | | | | | | |
| Example: | | | | | | | |
| 5 | None | | 0.2 | 3.4 | 9 | 330 | |
| 20 | Hydrogen | | 0.5 | 2.3 | 6 | | |
| 21 | do | | 1.9 | 1.6 | 6 | 320 | 21 |
| 26 | Propylene | 0.958 | 0.2 | 3.0 | 8 | | |
| 30 | do | 0.950 | 0.2 | 3.4 | 13 | | |
| 31 | do | | 0.6 | | | 330 | |
| 36 | do | 0.950 | 0.2 | 3.5 | 25 | | |
| 39 | do | 0.951 | 0.3 | 3.0 | 6.4 | 310 | |
| B.—Hexavalent chromium oxide | | | | | | | |
| Control: | | | | | | | |
| A | None | | 0.8 | 2.1 | 2.1 | | 8 |
| B | do | | 0.2 | 2.7 | 4.4 | 210 | 18 |
| C | Butene-1 | 0.955 | 0.2 | 2.3 | | 220 | 16 |

A comparison of melt index with viscosity may be used to make relative molecular weight distribution comparison in general the lower the intrinsic viscosity at a given melt index the narrower the molecular weight distribution. A comparison of data presented above reveals that the polymers prepared with a di-tertiary polyalicyclic chromate ester catalyst system have a significantly higher intrinsic viscosity and therefore a broader molecular weight distribution. This is supported by the ratio $A_w/A_n$ since melt index depends to a large extent on $A_n$ and intrinsic vis- 4. A process as claimed in claim 1 in which the hindered di-tertiary polyalicyclic chromate ester is bis-adamantyl chromate.

5. A process as claimed in claim 1 in which the hindered di-tertiary polyalicyclic chromate ester is a di-2-alkyl bornyl chromate.

6. A process as claimed in claim 5 in which the di-2-alkyl bornyl chromate is di-2-methyl bornyl chromate.

7. A process as claimed in claim 1 in which the hindered di-tertiary polyalicyclic chromate ester is a di-2-alkyl fenchyl chromate.

8. A process as claimed in claim 7 in which the di-2-alkyl fenchyl chromate is di-2-methyl fenchyl chromate.

9. A process as claimed in claim 4 in which the organometallic reducing agent compound is a trialkyl aluminum compound, alkylaluminum halide compound, alkyl aluminum hydride compound, aluminum alkoxide compound, alkyl boron compound, or an organo zinc compound.

10. A process as claimed in claim 5 in which the organometallic reducing agent compound is a trialkyl aluminum compound, alkylaluminum halide compound, alkyl aluminum hydride compound, aluminum alkoxide compound, alkyl boron compound, or an organo zinc compound.

11. A process as claimed in claim 6 in which the organometallic reducing agent compound is a trialkyl aluminum compound, alkylaluminum halide compound, alkyl aluminum hydride compound, aluminum alkoxide compound, alkyl boron compound, or an organo zinc compound.

12. A process as in claim 8 in which the organometallic reducing agent compound is a trialkyl aluminum compound, alkyl aluminum halide compound, alkyl aluminum hydride compound, aluminum alkoxide compound, alkyl boron compound, or an organo zinc compund.

13. A process as claimed in claim 1 in which the inorganic oxide has a surface area of from about 50 to about 1000 square meters per gram.

14. A process as claimed in claim 13 in which the inorganic oxide is silica, alumina, thoria, zirconia or mixture thereof.

15. A process as claimed in claim 1 in which the polymerization reaction is conducted in the presence of hydrogen.

16. A process as clamed in claim 1 in which the polymerization reaction is conducted at a temperature of from about 30° C. to about 200° C. and at a pressure of from about 20 p.s.i.g. to about 800 p.s.i.g.

17. A process for the polymerization of ethylene which comprises contacting ethylene with a catalytic amount of a hindered di-tertiary polyalicyclic chromate ester, deposited on an inorganic oxide having a surface area of from about 50 to 1000 square meters per gram and treated with organometallic reducing agent compound, at a temperature of about 30° C. to about 200° C. and at a pressure of from about 20 p.s.i.g. to about 800 p.s.i.g.

18. A process as claimed in claim 17 in which a minor amount of at least one other polymerizable α-olefin is present.

19. A process as claimed in claim 17 in which the hindered di-tertiary polyalicyclic chromate ester is bis-adamantyl chromate.

20. The process as claimed in claim 17 in which the hindered di-tertiary polyalicyclic chromate ester is di-2-methyl bornyl chromate.

21. A process as claimed in claim 17 in which the hindered di-tertiary polyalicyclic chromate ester is di-2-methyl fenchyl chromate.

22. A process as claimed in claim 17 in which hydrogen is present.

23. A process as claimed in claim 18 in which hydrogen is present.

24. A process as claimed in claim 20 in which hydrogen is present.

25. A process as claimed in claim 21 in which hydrogen is present.

26. A catalyst for the polymerization of ethylene which comprises a hindered di-tertiary polyalicyclic chromate ester treated with an organometallic reducing agent compound selected from the group consisting of trialkyl aluminum compounds, alkyl aluminum halide compounds, alkyl aluminum hydride compounds, aluminum alkoxide compounds, alkyl boron compounds, and organo zinc compounds and deposited on an inorganic oxide support of high surface area.

27. A catalyst as claimed in claim 26 in which the hindered di-tertiary polyalicyclic chromate ester is bis-adamantyl chromate.

28. A catalyst as claimed in claim 26 in which the di-tertiary polyalicyclic chromate ester is di-2-methyl bornyl chromate.

29. A catalyst as claimed in claim 26 in which the di-tertiary polyalicyclic chromate ester is di-2-methyl fenchyl chromate.

References Cited

UNITED STATES PATENTS 3,157,712  11/1964  Walker et al. _____ 260—683.15

JOSEPH L. SCHOFER, Primary Examiner

A. HOLLER, Assistant Examiner

U.S. Cl. X.R.

252—426, 449; 260—94.9 B, 94.9 D

PO-1050
(5/69)

UNITED STATES PATENT OFFICE
CERTIFICATE OF CORRECTION

Patent No. 3,642,749      Dated February 15, 1972

Inventor(s) R. N. Johnson et al.

It is certified that error appears in the above-identified patent and that said Letters Patent are hereby corrected as shown below:

Column 7, line 7, should read --the like. Particularly preferred solvent media are cyclo- --;

Column 9, line 68, "weigher" should read --weighed--;

Column 10, line 10, "10.8" should read --10.8$\mu$--;

Column 14, in Table II, the MF/MI value for Example 35 should read --87--;

Column 13, in Table III, "Percent extension" should read --Percent Ext.--;

Column 5, line 7, "dihexyaluminum" should read --dihexylaluminum-- and in line 26 "agents" should read --agent--.

Signed and sealed this 18th day of July 1972.

(SEAL)
Attest:

EDWARD M. FLETCHER, JR.      ROBERT GOTTSCHALK
Attesting Officer      Commissioner of Patents